Dec. 8, 1936.   W. H. SCHNEIDER   2,063,344
CHUCK
Filed March 5, 1935
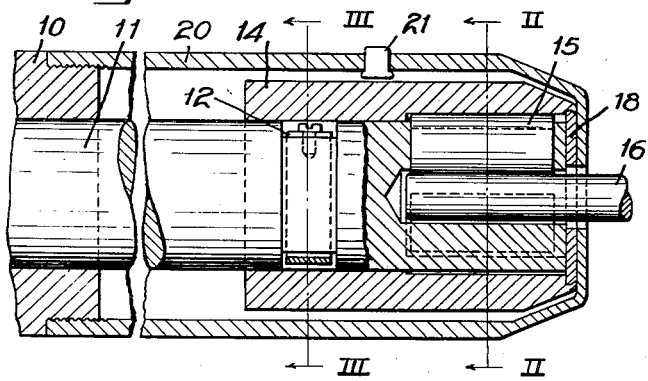
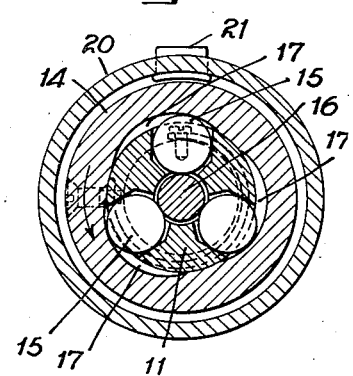
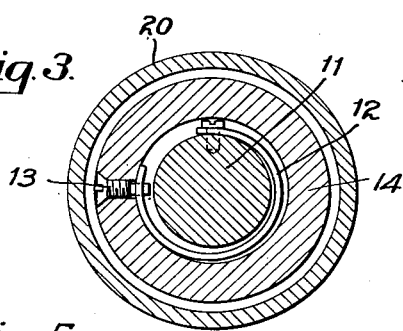
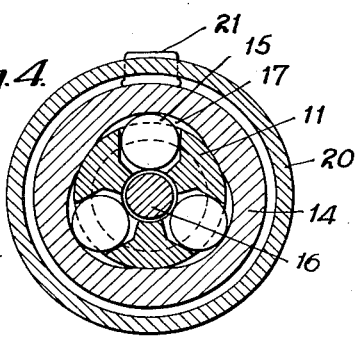
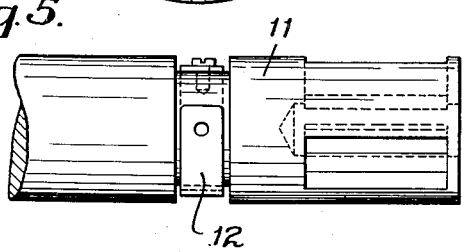
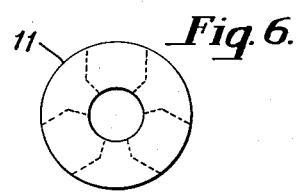
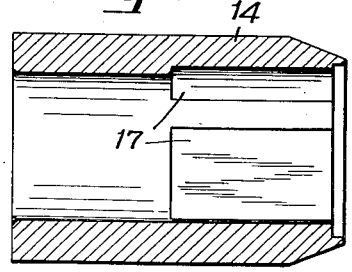
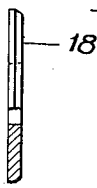
INVENTOR
William H. Schneider,
By Archworth Martin,
Attorney.

Patented Dec. 8, 1936

2,063,344

UNITED STATES PATENT OFFICE 2,063,344

CHUCK

William Henry Schneider, Pittsburgh, Pa.

Application March 5, 1935, Serial No. 9,379

2 Claims. (Cl. 279—72)

My invention relates to chucks, and is hereinafter described as of a type particularly suitable for use in connection with small tools such as dentists' drills, grinders, reamers, taps, and the like, but various features thereof are capable of use in connection with various other classes of work.

One object of my invention is to provide a chuck of such form that tools may be conveniently applied to and removed therefrom, without the necessity of stopping the shaft which drives the chuck.

Another object of my invention is to provide an improved means whereby the chuck can be conveniently held by the operator and readily manipulated to effect engagement and disengagement of the tools.

A further object of my invention is to provide a chuck of the roller or ball type that can be readily changed for use with drive shafts that rotate in different directions.

Still another object of my invention is to provide a chuck of the type referred to, wherein the eccentric seats and rolling surfaces for the balls or rollers can be more quickly and accurately formed than in the case of various previously-known types of chucks.

One form which my invention may take is shown in the accompanying drawing wherein Figure 1 is a longitudinal sectional view of the chuck; Fig. 2 is a view taken on the line II—II of Fig. 1; Fig. 3 is a view taken on the line III—III of Fig. 1; Fig. 4 is a view similar to that of Fig. 2, but showing the chuck parts in released position; Fig. 5 is a side view of a portion of the apparatus of Fig. 1; Fig. 6 is an end view thereof; Fig. 7 is a longitudinal sectional view of the clutch sleeve of Fig. 1, and Fig. 8 is a view of the end plate for the clutch sleeve.

A portion of a holder whereby the operator may hold the chuck is represented by the numeral 10, which holder may suitably be of sleeve-like form and through which extends a shaft 11 that may be driven from a suitable source of power, such as an electric motor. In the case of dental tools, the shaft 11 would be driven from a flexible shaft.

The shaft 11 is provided with a peripheral slot to the innermost wall of which is secured an end of a spring 12. The other end of the spring 12 has connection with the inner end of a screw 13 which has threaded engagement with a chuck sleeve 14. The forward end of the shaft 11 is reamed out to form recesses for the reception of rollers 15 that function as gripping elements or clutch members for engagement with the shank of a tool 16 that is inserted into a central opening in the end of the shaft 11.

The sleeve 14 has a cam surface 17 formed on its inner wall for each of the rollers 15. It will be seen that when the rollers 15 are moved in either direction from the center of the cam surfaces 17, in the sleeve 14, that they will be brought into gripping engagement with the tool shank 16, so that the tool will rotate with the shaft 11. The tension of the spring 12 is such that the parts will normally be maintained in tool-gripping position.

An important feature of my invention consists in having the cam surfaces 17 each formed throughout its length on an arc of constant radius, so that the rollers will be held in gripping engagement with the tool at either of the opposite positions of the rollers on said camming surfaces.

The spring 12 can be reversed so as to cause the sleeve 14 to move in a clockwise direction from the position indicated in Fig. 4, so that if the shaft 11 is driven in the direction opposite to that indicated by the arrow in Fig. 2, the tool 16 will be properly gripped by the rollers 15. This feature is of particular utility as it will permit of the chuck being employed with shafts driven in either direction.

Also, the camming surfaces 17 can be more readily and accurately formed since they require machining by only a single tool of a proper radius, and thus avoiding the more difficult operation of forming camming surfaces along lines which are of constantly changing radius. A closure plate 18 is provided for the end of the chuck sleeve 14, and is inserted in an annular recess formed in the said sleeve, the end of the sleeve being peened down to securely hold the plate in place. The plate serves as an end stop to prevent the sleeve 14 from slipping rearwardly on the shaft 11, and also to close the front of the chuck against the entrance of grit and dirt.

A sleeve-like extension 20 is carried by the holder 10, and carries a brake button 21 that may be pushed into engagement with the chuck sleeve 14, in order to retard rotative movement of the sleeve 14, and cause further rotative movement of the shaft 11 to contract the spring 12 and move the rollers 15 to the position shown in Fig. 4, where they will no longer have gripping engagement with the tool shank 16.

At such position of the parts, the shaft can continue to rotate, and at the same time, the tool 16 can be removed and another tool inserted. Upon release of the button 21, the spring 12 will again expand to move the sleeve 14 forwardly relative to the shaft 11, to the position shown in Fig. 2. If the position of the spring as shown in Fig. 3 is reversed, the sleeve 14 will be moved to a position the reverse of that shown in Fig. 2, so as to cause gripping engagement with the tool when the shaft is driven in the opposite direction.

The sleeve-like extension 20 not only affords a convenient means for supporting the brake button, but enables the operator to hold the chuck without danger of his hands coming into contact with rotating parts of the apparatus. However, the handle 10 and the sleeve 20, together with the brake button 21, can be eliminated, and the shaft 11 otherwise suitably supported, in which case release of the chuck elements would be effected by the operator simply pressing his thumb or fingers on the chuck sleeve 14 to cause contraction of the spring 12 during continued rotation of the shaft 11 relative to the sleeve 14.

I claim as my invention:—

1. The combination with a chuck shaft, of a cage carried by the forward end of the shaft and having radially extending openings, gripping elements loosely fitting within said openings and arranged to grip a tool shank which is positioned centrally of the cage, an oscillatory chuck sleeve encircling the cage, and provided with camming means for forcing the said gripping elements inwardly into gripping engagement with a tool shank, at either of two opposite rotative positions of the sleeve, a spring connected to the chuck sleeve and the shaft, and serving to normally yieldably hold the sleeve with the backwardly-extending camming surface of each camming means in engagement with its associated gripping element, when the chuck shaft is to be driven in one direction, the said spring being reversible to so hold the sleeve that its other camming surfaces engage said gripping elements when the chuck shaft is to be driven in the opposite direction, a stationary handle for the chuck, positioned adjacent to the said sleeve, and a braking device carried by said handle for movement into engagement with the said sleeve to retard movement thereof and cause retraction of the sleeve through continued rotation of the chuck shaft, said spring limiting retractive movement of the sleeve to cause release of said gripping elements.

2. The combination with a chuck shaft, of a cage carried by the forward end of the shaft and having radially-extending openings, gripping elements loosely fitting within said openings and arranged to grip a tool shank which is positioned centrally of the cage, an oscillatory chuck sleeve encircling the cage and provided with arcuate recesses opposite each gripping element, the bottom walls of the recesses being disposed on lines of a radius that is shorter than the internal radius of the sleeve at points between the said recesses, so that the ends of the recesses intersect the inner wall of the sleeve, whereby each gripping element may have cooperative camming engagement with the bottom wall of its associated recess at points toward either end of each recess, and a spring disposed around the chuck shaft and secured at its ends to the sleeve and the shaft, respectively, and serving to normally yieldably hold the sleeve in its maximum jaw-projecting position adjacent to said intersecting ends of the recesses, the sleeve being held so that the backwardly-extending camming surface of each recess is in engagement with its associated gripping element when the chuck shaft is to be driven in one direction, and the said spring being reversibly mountable on said shaft to so hold the sleeve that its other camming surfaces engage said gripping elements when the chuck shaft is to be driven in the opposite direction, the spring being of such length that when contracted the sleeve will be held with the mid-point of said recesses thereof radially opposite said gripping elements.

WILLIAM H. SCHNEIDER.